United States Patent [19]

Frutschi

[11] Patent Number: 4,686,822

[45] Date of Patent: Aug. 18, 1987

[54] GAS TURBINE POWER STATION WITH AIR STORAGE AND METHOD FOR OPERATING THE SAME

[75] Inventor: Hansulrich Frutschi, Riniken, Switzerland

[73] Assignee: BBC Brown, Boveri & Company Limited, Baden, Switzerland

[21] Appl. No.: 921,884

[22] Filed: Oct. 22, 1986

Related U.S. Application Data

[62] Division of Ser. No. 673,942, Nov. 21, 1984, abandoned.

[30] Foreign Application Priority Data

Jan. 31, 1984 [CH] Switzerland .......................... 446/84

[51] Int. Cl.$^4$ ............................................. F02C 7/00
[52] U.S. Cl. ..................................... 60/39.02; 60/727
[58] Field of Search ................... 60/39.02, 39.163, 727; 415/162, 163

[56] References Cited

U.S. PATENT DOCUMENTS

| | | | |
|---|---|---|---|
| 2,371,706 | 3/1945 | Planiol | 415/162 |
| 2,613,029 | 10/1952 | Wilde | 415/162 |
| 3,101,926 | 8/1963 | Weber | 415/163 |
| 3,643,426 | 2/1972 | Janelid | 60/39.02 |
| 4,312,179 | 1/1982 | Zaugg | 60/39.02 |
| 4,403,477 | 9/1983 | Schwarzenbach | 60/727 |
| 4,522,024 | 6/1985 | Zaugg | 60/727 |

FOREIGN PATENT DOCUMENTS 3000961 6/1981 Fed. Rep. of Germany ........ 60/727

*Primary Examiner*—Louis J. Casaregola
*Attorney, Agent, or Firm*—Oblon, Fisher, Spivak, McClelland & Maier

[57] ABSTRACT

The gas turbine of an air storage gas turbine power station is so designed that it can provide the nominal output requirement without extracting air from the storage cavern (17). The compressor group (3+4) has internal control organs in the form of guide vanes and possibly also rotor blading which can be adjusted during operation. This adjustable blading makes it possible to maintain the pressure ratio necessary for attaining the nominal power during the other operating conditions also and makes it possible to keep the compressor final pressure at at least the same level as the storage air pressure. By this means, it is possible to fill the storage cavern (17) during the whole of the part-load range and during idling operation in addition to filling it by exclusively electric motor drive of the compressor group (3+4) by the generator (2 or 31), connected as motor, or by an electric motor (29) specially provided for this purpose. So that the rigid coupling between the compressor group (3+4) and the running turbine (1 or 30) can be made or broken, a rotational speed synchronizing device is provided between the line of driving shafts (5+6) of the turbine, preferably in the form of a hydrodynamic torque converter (7 or 33) which can be locked or of an electromagnetic induction coupling. The turbine (1; 30) preferably has adjustable guide vanes or partial admission in the first stage.

5 Claims, 2 Drawing Figures

GAS TURBINE POWER STATION WITH AIR STORAGE AND METHOD FOR OPERATING THE SAME

This application is a division of application Ser. No. 673,942, filed Nov. 21, 1984 (abandoned).

FIELD OF THE INVENTION

The present invention concerns a gas turbine power station selectively operable by means of a rechargable air supply.

BACKGROUND OF THE INVENTION

The invention arises from the object of developing a method by which the turbine of a gas turbine power station can not only be operated as a conventional turbine with a directly coupled compressor group but also as a pure storage air gas turbine which draws its combustion air exclusively from an air reservoir, and can be fed in any given mixture ratio from these two compressed air sources.

In order to satisfy these requirements, a conventional gas turbine installation must be designed for a compressor pressure ratio which makes it compatible for operation with an air reservoir, generally speaking therefore with an underground air storage cavern. This means that if, for example, the pressure in the cavern is 50 bar at approximately ambient temperature, the pressure ratio of the compressor group should be $\pi 50$. Stated more precisely, the compressor final pressure must be at least equal to the pressure in the storage cavern during types of operation in which the compressor group supplies air, either exclusively or in part, into the storage cavern.

In present day air storage gas turbine installations, the pressure ratio is in the range between 40 and 70. It is produced by multistage industrial axial compressors with multiple intercooling and after-cooling of the compressed air before it enters the storage cavern. The output of these compressors, in known air storage gas turbine power stations, is substantially less than the air mass flow necessary for the full power of the turbine, for example a quarter of it. This means that, during the low load periods in which the compressor group is driven by the generator—used as a motor,—the compressor group must operate four times as long in order to replace the air used by the turbine from the storage cavern. Under certain circumstances, this can mean an intolerable limitation to the available electrical operating capacity, in particular to the time of operation of the turbine. However, even if the compressor mass flow is selected to be the same as or even greater than the turbine mass flow, only the air quantity supplied by the compressors to the cavern can serve, as a maximum, as operating air for the turbine. As soon as this is consumed, it is necessary to change back from power operation to pumping operation. It is, therefore, only possible to store and subsequently generate electrical energy during time intervals limited to a greater or lesser extent.

The relationships are different in the case of ordinary gas turbine power stations. In these, the compressor is permanently driven by the turbine and continuously and instantaneously provides the combustion air needed by the turbine so that any given length of operating period is possible. Such gas turbine installations, however, are pure thermal electricity generators and do not permit storage of electrical energy. At times of low electricity consumption (i.e., in part load operation), their efficiency decreases substantially so that part load operation can become economically unfavourable.

OBJECT OF THE INVENTION

These disadvantages of the known gas turbine power stations can be avoided by the gas turbine power station disclosed herein in association with the method disclosed herein for its optimum operation over the whole load range. In particular, this makes possible overload operation in which, with integration of the compressor group, the load can be increased beyond that for pure gas turbine operation.

DETAILED DESCRIPTION OF THE PRESENTLY PREFERRED EMBODIMENTS

Figure 1:
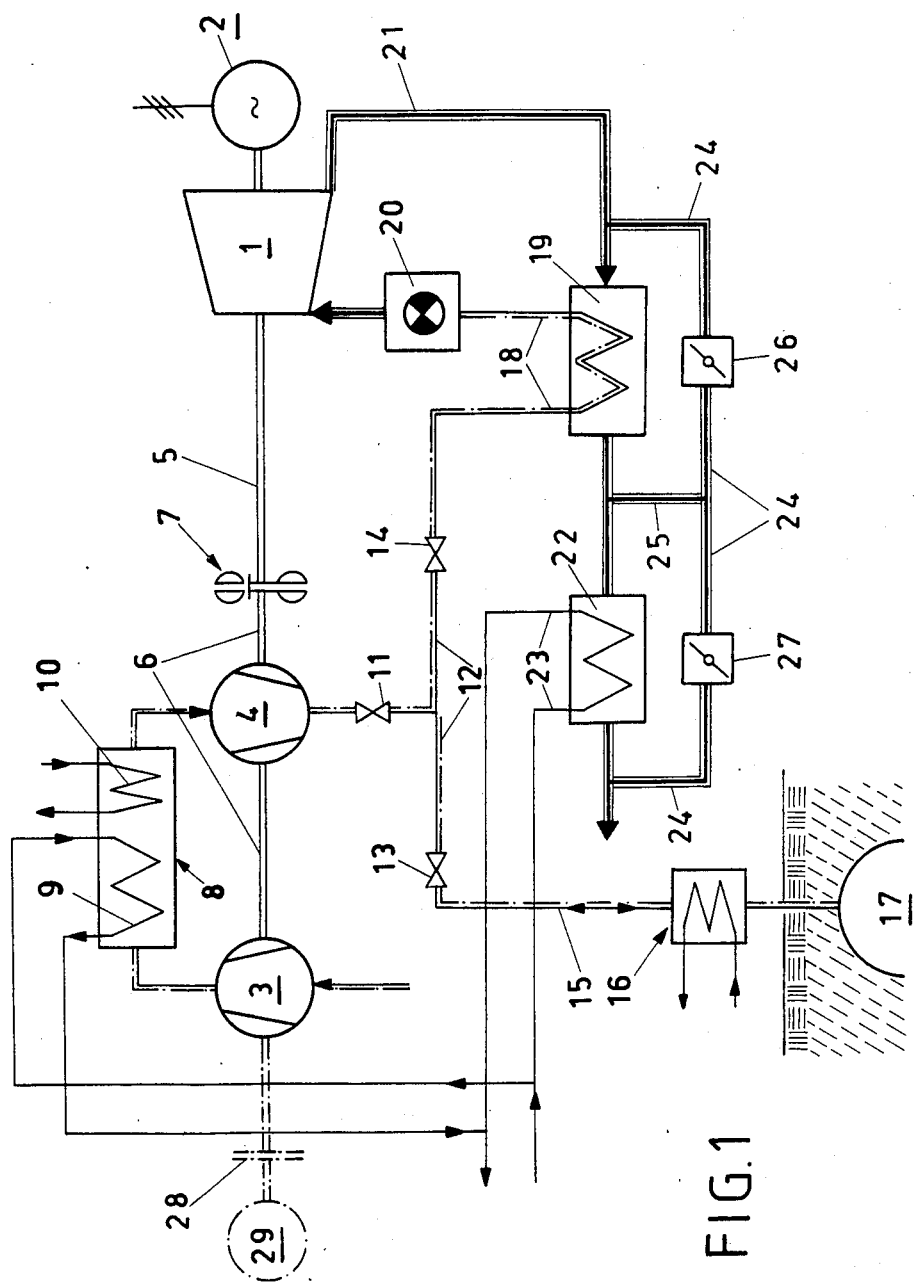
FIGS. 1 and 2 of the drawing represent two embodiments of the subject matter of the invention.

In FIG. 1, a turbine is designated by 1 and a generator, which can be operated as an electrical motor, is designated by 2. The turbine has internal control organs, either in the form of guide vanes which can be varied in operation or in the form of partial admission. The shafts of the turbine 1 and of the generator 2 are rigidly connected together. A hydrodynamic torque converter 7 of known type with a mechanical bridging device is provided between the turbine shaft 5 and a compressor shaft 6. The compressor shaft 6 couples together a low pressure compressor 3 and a high pressure compressor 4. The torque converter 7 makes it possible to couple the shafts 5 and 6 with either torque conversion or rigid connection between the two shafts, and it also makes complete uncoupling possible. Instead of such a torque converter which makes it possible to bring the compressor group formed by the two compressors 3 and 4 to the speed of the running turbine 1 or, in the case where the air supplied by the compressor group 3+4 is exclusively stored in a storage cavern, to bring them to the speed of the generator 2, acting as a motor, and to synchronise them by rigid coupling of the shafts 5 and 6, it would, for example, also be possible to use an electromagnetic induction coupling, by means of which a torsionally elastic synchronisation is attained. In this case, it is not necessary to provide for locking. The compressor group 3+4 is, like the turbine 1, equipped with internal control organs, in fact with guide vanes adjustable during operation and possibly also, in addition, with adjustable rotor blades.

In the case of an electromagnetic induction coupling, the half-coupling seated on the driven shaft, i.e. on the compressor shaft 6, is brought up to the turbine speed by the half-coupling seated on the driving turbine shaft 5 and, on attainment of synchronisation, is driven along without slip. When using the hydrodynamic torque converter 7, the compressor shaft 6 is brought to a speed slightly above the turbine speed (by appropriate adjustment of the torque), after which the compressor shaft 6 is then allowed to drop to the synchronisation speed and then mechanically bridged so that the torque converter 7 becomes a coupling. In the present application, therefore, the hydrodynamic torque converter 7 and the electromagnetic induction coupling have a speed synchronising function.

The air induced from the atmosphere and compressed to an intermediate pressure by the low pressure compressor 3 passes through an intermediate cooler 8 in which it gives up part of the compression heat to some sort of heating surface, for example to a heating surface 9 for a district heating grid and a heating surface 10 for heating the power station building.

From the intermediate cooler 8, the intermediate pressure air passes into the high pressure compressor 4. From the high pressure compressor the air, compressed to high pressure, passes through a shut-off valve 11 into a high pressure air pipe 12. Then, depending on the type of operation and controlled by a storage valve 13 and a throttle valve 14, the high pressure air is forced in one or the other of two directions. If the throttle valve 14 is closed and the storage valve 13 is open, the air is forced via a storage air pipe 15, after passing an after-cooler 16 for the compressed air, exclusively into a storage cavern 17. If the storage valve 13 is closed and the throttle valve 14 is opened to correspond to the turbine power, the high pressure air is forced via a turbine air pipe 18 into a recuperator 19 from which it passes, preheated, into a combustion chamber 20. The driving gases produced in the combustion chamber 20 flow, after doing work in the turbine 1, through an exhaust gas pipe 21 and normally through the recuperator 19 and a heat exchanger 22 where part of the exhaust heat is given up, for example, to a district heating grid 23. The exhaust gases then emerge into the atmosphere. Bypass pipes 24, 25 and cut-off and throttle butterflies 26 and 27 provided in the bypass pipe 24 act to provide open circuit or feedback control of the heat output from the exhaust gases to the recuperator 19 and/or to the heat exchanger 22.

In a variant of this embodiment, a separate electric motor 29, which can be coupled and uncoupled by means of a clutch 28, is provided for the compressor group 3+4. This additional drive, shown chain-dotted in FIG. 1, has the advantage that, when the air supplied by the compressor group is being exclusively stored in the storage cavern 17, the generator 2, with the rigidly coupled and hence power-consuming turbine 1, does not need to be used as the driving motor.

Figure 2:
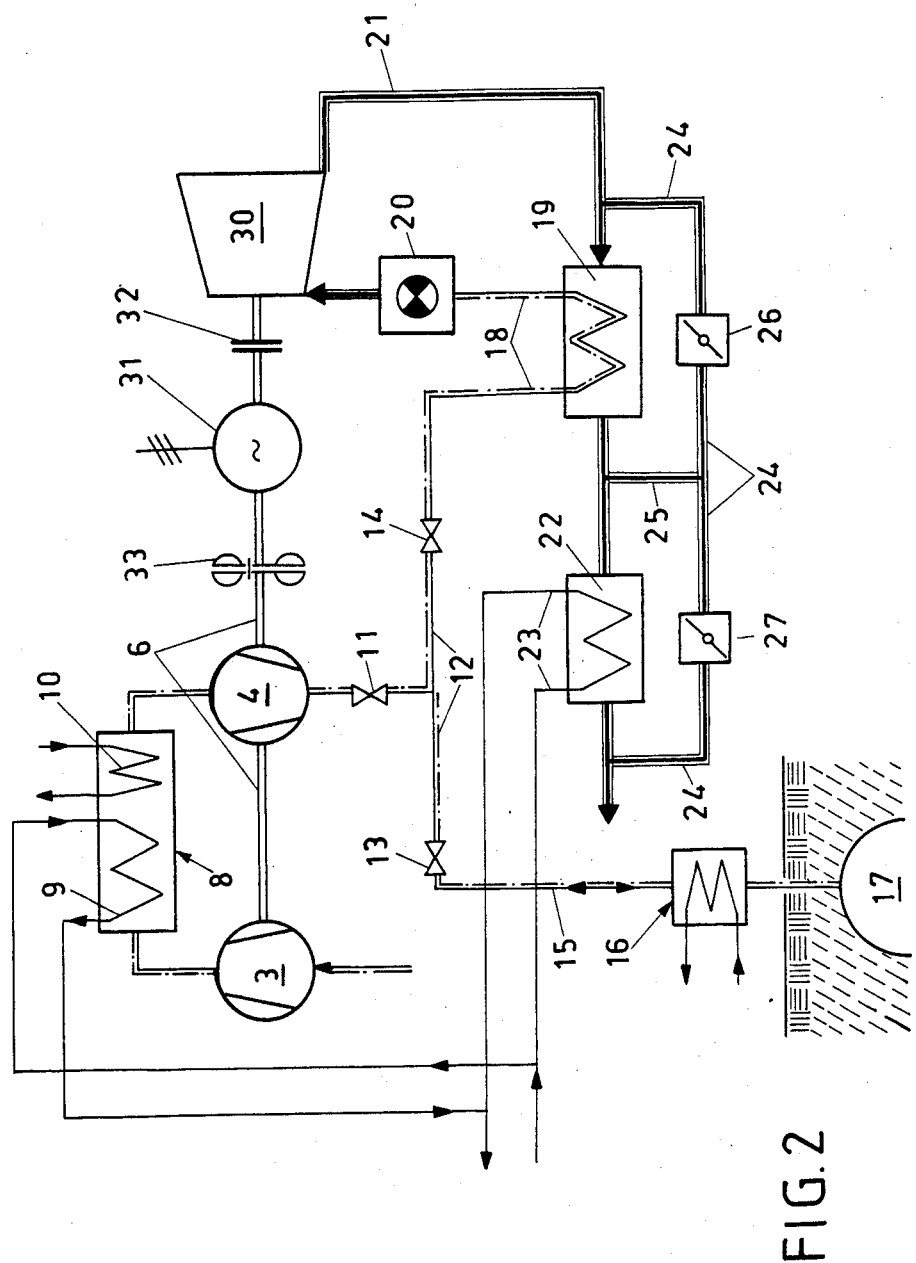

In the further embodiment shown in FIG. 2, the elements have the same reference numbers where they correspond in lay-out and function to those of FIG. 1. They do not, therefore, need to be described further.

The difference between this embodiment and that of FIG. 1 consists in the arrangement of the turbine 30 and the generator 31, which can also be operated as an electric motor, in relation to the compressor group 3+4. The generator/motor 31 is here located, in terms of drive, between the turbine 30 and the compressor group 3+4 and can be brought in and out of drive connection with the turbine 30 by means of a clutch 32. A hydrodynamic torque converter 33, which has the same function as the torque converter 7 in FIG. 1 and instead of which the electromagnetic induction coupling previously mentioned can also be used, is provided in this case between the generator 31 and the compressor group 3+4. Otherwise, the installation corresponds to FIG. 1, as already mentioned.

The method according to the invention for operating this total of three variants of the gas turbine power station according to the invention has a series of types of operation which agree for all three embodiments. There are, in addition, two additional types of operation caused by the three different configurations of the machine group.

The common types of operation consist of the following, with the shut-off valve 11 fully open of course in all the cases.

The power station is operated at nominal power as a pure gas turbine without storage air from the storage cavern 17. In the embodiment according to FIG. 1, the turbine 1, which is continually rigidly coupled to the generator 2, is then also rigidly connected to the compressor group 3+4 with the torque converter 7 locked. In this mode of operation, the turbine 1 obtains compressed combustion air exclusively from the compressor group 3+4 when the storage valve 13 is closed and the throttle valve 14 is fully open. The variable blading of the compressor group 3+4 and, if present, that of the turbine 1 is then in the nominal power position.

In the variant of FIG. 1 with the electric motor 29 drawn chain-dotted, the latter is disconnected from the compressor shaft 6 by means of the clutch 28.

In the installation according to FIG. 2, the half-couplings of the clutch 32 between the turbine 30 and the generator 31 are in engagement in this type of operation, and the torque converter 33 between the generator and the compressor group 3+4 is mechanically bridged (i.e., locked).

In the second common type of operation, part load operation, the turbine 1 or 30 is again rigidly connected to the appropriate compressor group 3+4 and the appropriate generator 2 or 31 as described above. The compressor blading is then fully open, and the supply to the turbine 1 or 30 is limited by means of the throttle valve 14, by partial closing of the turbine guide vanes, or by partial admission to the turbine corresponding to the power demanded. The storage valve 13 is fully open so that part of the air supplied by the compressor group 3+4 is forced via the storage air pipe 15 and the after-cooler 16 into the storage cavern 17.

The throttling is adjusted by the throttle valve 14 and the storage valve 13 acting in conjunction. The former is closed to a greater or lesser extent, and the latter is opened. The compressor group 3+4 is designed in every case so that it supplies the same final pressure at all operating conditions in which it participates, and this final pressure must be at least equal to the highest permissible storage pressure. Constant pressure storage is assumed with pressure compensation of known type, preferably by a hydraulic seal. The compressor group described above has the property that, for a certain position of the blading (for example, the fully open position), it delivers a constant airflow. Whatever part of this airflow is not used by the turbine 1 or 30 is accepted by the storage cavern 17.

A further type of operation common to all the embodiments is idling operation with air storage. In this mode of operation, the turbine 1 or 30 is rigidly coupled to the compressor group 3+4 and the generator 2 or 31. The rigid coupling is accomplished with the mechanically locked torque converter 7 in the embodiment according to FIG. 1 and with the clutch 32 in engagement and the torque converter 33 locked in the embodiment according to FIG. 2. In this type of operation, the major part of the air supplied by the compressor group 3+4 is forced into the storage cavern 17, while the turbine is supplied with just enough air for it to provide sufficient power to drive the compressor group 3+4 when the generator output is zero. In this type of operation, the maximum possible proportion of the compressor air, which represents the energy proportion gained from the fuel, is stored.

The next common type of operation is overload operation. In this type of operation, the turbine 1 or 30, compressor group 3+4 and the generator 2 or 31 are rigidly coupled together, and the blading of the compressor group 3+4 is set to the smallest permissible flow quantity. The excess air quantity necessary in addition to the air flow delivered by the compressor group 3+4 is then taken from the storage cavern 17. This type of operation is obtained, starting with operation as a pure gas turbine without storage air extraction, by reducing the air supply and hence the power requirement of the compressor group 3+4 by closing up (i.e., partially closing) the compressor blading. The turbine 1 or 30 is then kept at the same power as in the case of pure gas turbine operation by extracting air from the storage cavern 17. The power saved at the compressor group 3+4 then acts to the benefit of the generator 2 or 31 as overload capability. The maximum overload is determined by the surge line of the compressor group 3+4.

The last common type of operation possible with all the embodiments described is maximum power operation. In this type of operation, the compressor group 3+4 is brought to rest, the turbine 1 or 30 and the generator 2 or 31 therefore being uncoupled from the compressor group 3+4 and the shut-off valve 11 after the compressor group 3+4 being shut off. The storage valve 13 and the throttle valve 14 are fully opened, and the turbine 1 or 30 is exclusively supplied with storage air. The generator 2 or 31 now receives the full, freely available turbine power. Because the power requirement of the compressor group 3+4 has disappeared, the power available for driving the generator 2 or 31 is now 2 to 2> times that available from operation as a pure gas turbine with no storage air supply.

Pure storage operation (i.e., charging the storage cavern 17 with the turbine 30 at rest), is a type of operation which is possible with the embodiment according to FIG. 2 and is also possible with the embodiment according to FIG. 1 in the presence of the electric motor 29, which can be coupled and uncoupled by means of the clutch 28. In the case of FIG. 2, this is done by releasing the clutch 32 so that the compressor group 3+4 is driven by the generator 31 (connected as a motor). In the case of FIG. 1 with the chain-dotted supplements 28 and 29, it is done by uncoupling the turbine 1 plus the generator 2, emptying the torque converter 7, and coupling the electric motor 29 to the compressor group 3+4 via the clutch 28. The compressor group 3+4 then exclusively supplies the storage cavern 17 with the storage valve 13 fully open and the throttle valve 14 closed.

This extreme type of operation, which permits pure air storage, will not be necessary for every site. Part load operation and idling operation with air storage are often sufficient.

An air storage type of operation is only appropriate for the embodiment according to FIG. 1 without the additional electric motor 29 shown chain-dotted. This type of operation consists in the generator 2 driving the turbine 1 and, via the locked torque converter 7, the compressor group 3+4. The combustion chamber 20 is then switched off, and the turbine 1 only receives, via the throttle valve 14, a small cooling airflow sufficient to cool it, while the main proportion of the compressor air flow is forced into the storage cavern 17. The cooling air removes the heat arising due to ventilation. This type of storage is not as favourable from the point of view of energy consumption as that previously described, in which the compressor group 3+4 is driven by an electric motor specially provided for that purpose. On the other hand, the installation costs of such a variant are lower. Particularly in the case where pure storage operation only takes place in exceptional circumstances, this type of operation can be appropriate.

Instead of the arrangement shown in FIG. 1 of the generator 2 on the end of the turbine shaft 5, the generator 2 can also be placed at the position of the motor 29 shown chain-dotted, omitting the clutch 28. With this arrangement, the types of operation described above (such as gas turbine operation, part load operation, idling operation, with air storage, pure air storage operation and overload operation) could be carried out. The maximum load operation, however, could only be carried out to a reduced extent because the compressor group 3+4 located between the turbine 1 and the generator 2 would have to continue to run and blow off to atmosphere. Due to the fact that the maximum possible useful power deteriorates, however, the specific installation costs increase with negative effects. For this reason, an arrangement according to FIG. 1 or FIG. 2 is preferable. However, with the arrangement of the generator on the compressor side, the torque converter 7 would then only be necessary for running up the compressor group 3+4 (including the generator) to the point of synchronisation and switching into parallel with the grid after the line of shafts 5, 6 had come to rest. The mechanical energy required for running up would then be supplied by the turbine 1 using compressed air from the storage cavern 17, which corresponds to the present state of technology.

This fourth embodiment form leads to a further type of operation which is not, however, as favourable as those described above.

I claim:

1. Method for driving a gas turbine power station with air storage having a gas turbine, a multi-stage compressor group which can be driven by the turbine, having intermediate coolers and an aftercooler, having a generator which is selectively operable as an electric motor, having compressed air pipes which connect the turbine to the compressor group and to an underground air storage cavern, having valve devices in the compressed air pipes by means of which the turbine can be brought into fluid connection with the compressor group, with the air storage cavern alone, or simultaneously with both, or the compressor group can be brought into fluid connection with the air storage cavern alone, in addition having a recooperator for preheating of the compressed air by the turbine exhaust gas before the entry of the compressed air into a combustion chamber, wherein:

(a) the compressor group is designed for a pressure ratio at which the compressor final pressure is at least equal to the maximum storage air pressure;

(b) a rotational speed synchronizing connecting device is provided in the line of driving shafts between the turbine and the compressor group, with which speed synchronizing connecting device the speed of the shaft of the compressor group can be brought to the speed of the turbine shaft and the shaft of the compressor group can be mechanically rigidly coupled to the line of driving shafts of the turbine; and (c) the throughput of the compressor group can be adjusted during operation, said method comprising the steps of:

(d) operating the power station at nominal power without storage air, the turbine being rigidly coupled to the compressor group and the generator, by supplying the turbine with compressed air exclusively from the compressor group with the compressor guide vanes fully open and therefore at maximum output flow;

(e) operating the power station at part load, the turbine being rigidly coupled to the compressor group and the generator and the compressor blading being fully open, with throttle supplied to the turbine and storage of the remainder of the air supplied by the compressor group in the storage cavern;

(f) operating the power station at idle with air storage, the turbine being rigidly coupled to the compressor group and the generator and a part of the air supplied by the compressor group being supplied to the storage cavern, with a reduced supply to the turbine of air from the compressor group such that the turbine power just suffices to drive the compressor group and the generator output is zero;

(g) operating the power station at overload, the turbine being rigidly coupled to the compressor group and the generator and the blading of the compressor group being closed to the smallest permissible flow quantity and the air necessary in addition to the air supplied by the compressor group being drawn from the storage cavern; and (h) operating the power station at maximum power, the compressor group being uncoupled from the turbine and the generator and the turbine being exclusively supplied with air from the storage cavern.

2. Method according to claim 1 for operating a gas turbine power station wherein an electric motor is provided at the end of the compressor group remote from the turbine, which electric motor can be coupled by means of a clutch to the compressor group, said method comprising the steps of:

(a) uncoupling the turbine from the compressor group;

(b) driving the compressor group by the electric motor especially provided for this purpose; and (c) exclusively supplying the air to the storage cavern.

3. Method according to claim 1 for operating a gas turbine station wherein:

(a) the generator is located in the driving shaft line between the turbine and the compressor group;

(b) a speed synchronizing connecting device is located between the generator and the compressor group;

(c) a clutch is provided in the driving shaft line between the turbine and the generator; and (d) the generator can be operated as an electric motor, said method comprising the steps of:

(e) uncoupling the turbine from the compressor group;

(f) driving the compressor group by the generator, connected as a motor; and (g) exclusively supplying the air to the storage cavern.

4. Method according to claim 1 for operating a gas turbine power station wherein the generator is located at the end of the turbine remote from the compressor group and the turbine shaft is rigidly connected to the generator shaft, said method comprising the steps of:

(a) driving the compressor group and the turbine by the generator;

(b) switching off the combustion chamber; and (c) throttling the supply of the turbine with air from the compressor group that the turbine only obtains the cooling air flow necessary for cooling and such that the residual main proportion of the air supplied by the compressor group is supplied to the storage cavern.

5. Method according to claim 1 for operating a gas turbine power station wherein the generator is located at the end of the compressor group remote from the turbine and the shaft of the compressor group is rigidly connected to the generator shaft, said method comprising the steps of:

(a) driving the compressor group and the generator by the turbine in such a way that, with the objective of maximum useful output of the generator, the compressor group blows down to atmosphere at minimum power requirement, and (b) exclusively supplying the combustion chamber with compressed air from the storage cavern.

* * * * *